(12) United States Patent
Sakurai et al.

(10) Patent No.: US 12,509,100 B2
(45) Date of Patent: Dec. 30, 2025

(54) VEHICLE TRAVELING PERFORMANCE CONTROL FUNCTION SIMULATION APPARATUS

(71) Applicant: SUBARU CORPORATION, Tokyo (JP)

(72) Inventors: Toru Sakurai, Tokyo (JP); Junichi Sato, Tokyo (JP); Shigeki Ogawa, Tokyo (JP); Yuusuke Sakata, Tokyo (JP); Kenichi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 223 days.

(21) Appl. No.: 18/166,790

(22) Filed: Feb. 9, 2023

(65) Prior Publication Data
US 2023/0264703 A1 Aug. 24, 2023

(30) Foreign Application Priority Data
Feb. 22, 2022 (JP) ................. 2022-026032

(51) Int. Cl.
*B60W 50/06* (2006.01)
*B60K 35/10* (2024.01)
(Continued)

(52) U.S. Cl.
CPC ............. *B60W 50/06* (2013.01); *B60K 35/10* (2024.01); *B60K 35/22* (2024.01); *B60K 35/26* (2024.01);
(Continued)

(58) Field of Classification Search
None
See application file for complete search history.

(56) References Cited

U.S. PATENT DOCUMENTS

| 2009/0062998 A1* | 3/2009 | Ushiroda | B60W 30/045 701/69 |
| 2010/0250049 A1* | 9/2010 | Nihei | B60W 10/06 701/1 |

(Continued)

FOREIGN PATENT DOCUMENTS

| JP | 10-10962 A | 1/1998 |
| JP | 2016-061706 A | 4/2016 |
| JP | 2017-102835 A | 6/2017 |

OTHER PUBLICATIONS

Office Action dated Aug. 26, 2025, issued in corresponding Japanese patent application No. 2022-006674, 8 pages.

*Primary Examiner* — David P. Merlino
(74) *Attorney, Agent, or Firm* — Rimon P.C.

(57) ABSTRACT

A vehicle traveling performance control function simulation apparatus includes a processor and a confirmation output member. The processor outputs a simulation related to a traveling performance control function for a vehicle with use of a vehicle inside member. The traveling performance control function is to be enabled by an operation performed by an occupant. The vehicle inside member is provided around the occupant. The confirmation output member outputs, with respect to the occupant, a confirmation as to whether outputting of the simulation related to the traveling performance control function is permitted. The processor outputs the simulation related to the traveling performance control function in a case where the outputting of the simulation is permitted on the basis of the confirmation. The processor does not output the simulation in a case where the outputting of the simulation is not permitted on the basis of the confirmation.

9 Claims, 6 Drawing Sheets

| PATTERN | OUTPUT MOVING IMAGE | VEHICLE BEHAVIOR IN MOVING IMAGE | OUTPUT TO | OUTPUT CONTENT CORRESPONDING TO VEHICLE BEHAVIOR |
|---|---|---|---|---|
| 1 | WHEEL SLIP → STUCK | SLIP | SPEAKER | SLIPPING SOUND |
| | | ENGINE ROAR | SPEAKER | BLOW-UP SOUND |
| | | INCREASE IN ENGINE SPEED | METER PANEL | DISPLAY CHANGE |
| | | VIBRATION OF STEERING WHEEL | STEERING WHEEL | VIBRATION |
| | | LATERAL G | LUMBAR SUPPORT | LEFT-RIGHT ALTERNATE DRIVING |
| 2 | RUN OVER OBSTACLE → STUCK | ENGINE SOUND | SPEAKER | BLOW-UP SOUND |
| | | INCLINED VEHICLE BODY | SEAT ACTUATOR | SEAT DRIVING |

(51) Int. Cl.
   *B60K 35/22* (2024.01)
   *B60K 35/26* (2024.01)
   *B60K 35/28* (2024.01)
   *B60W 50/08* (2020.01)
   *B60W 50/10* (2012.01)
   *B60W 50/14* (2020.01)

(52) U.S. Cl.
   CPC ........... *B60K 35/28* (2024.01); *B60W 50/085* (2013.01); *B60W 50/10* (2013.01); *B60W 50/14* (2013.01); *B60W 2050/146* (2013.01)

(56) References Cited

U.S. PATENT DOCUMENTS

| | | | |
|---|---|---|---|
| 2011/0224897 A1* | 9/2011 | Tan | G01C 21/36 |
| | | | 701/532 |
| 2019/0276051 A1* | 9/2019 | Marti | H04R 1/46 |
| 2020/0034102 A1* | 1/2020 | Hirota | G02B 27/01 |
| 2020/0406903 A1* | 12/2020 | Zweig | B60Q 1/535 |
| 2021/0370940 A1* | 12/2021 | Tejeda | B60W 50/0205 |
| 2023/0074953 A1* | 3/2023 | Obara | B60K 35/00 |
| 2023/0079042 A1* | 3/2023 | Yamazaki | B60K 35/60 |
| | | | 434/66 |

* cited by examiner

| PATTERN | OUTPUT MOVING IMAGE | VEHICLE BEHAVIOR IN MOVING IMAGE | OUTPUT TO | OUTPUT CONTENT CORRESPONDING TO VEHICLE BEHAVIOR |
|---|---|---|---|---|
| 1 | WHEEL SLIP → STUCK | SLIP | SPEAKER | SLIPPING SOUND |
| | | ENGINE ROAR | SPEAKER | BLOW-UP SOUND |
| | | INCREASE IN ENGINE SPEED | METER PANEL | DISPLAY CHANGE |
| | | VIBRATION OF STEERING WHEEL | STEERING WHEEL | VIBRATION |
| | | LATERAL G | LUMBAR SUPPORT | LEFT-RIGHT ALTERNATE DRIVING |
| 2 | RUN OVER OBSTACLE → STUCK | ENGINE SOUND | SPEAKER | BLOW-UP SOUND |
| | | INCLINED VEHICLE BODY | SEAT ACTUATOR | SEAT DRIVING |

FIG. 5

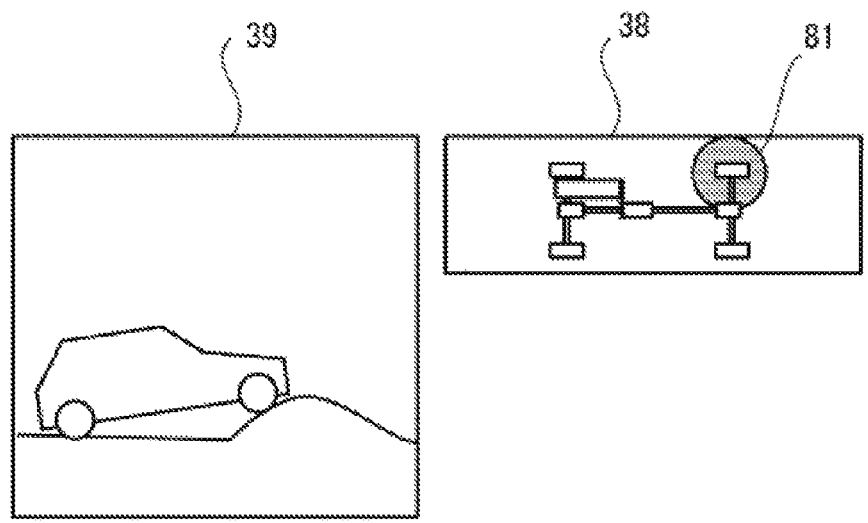

FIG. 6

VEHICLE TRAVELING PERFORMANCE CONTROL FUNCTION SIMULATION APPARATUS

CROSS-REFERENCE TO RELATED APPLICATIONS

The present application claims priority from Japanese Patent Application No. 2022-026032 filed on Feb. 22, 2022, the entire contents of which are hereby incorporated by reference.

BACKGROUND

The disclosure relates to a vehicle traveling performance control function simulation apparatus.

A vehicle is provided with various traveling performance control apparatuses for improving traveling performance of the vehicle. For example, as disclosed in Japanese Unexamined Patent Application Publication No. H10-010962, a vehicle is sometimes provided with an antilock brake system (ABS). Basically, the ABS controls braking force on wheels so that the wheels do not stop rotating upon sudden braking.

A vehicle is sometimes provided with a braking-and-driving control apparatus for a control such as a traction control. Basically, the braking-and-driving control apparatus controls braking force or driving force for each of the wheels of the vehicle.

SUMMARY

An aspect of the disclosure provides a vehicle traveling performance control function simulation apparatus that includes a processor and a confirmation output member. The processor is configured to output a simulation related to a traveling performance control function for a vehicle with use of a vehicle inside member. The traveling performance control function is provided for the vehicle and configured to be enabled by an operation performed by an occupant. The vehicle inside member is to be provided around the occupant who is to drive the vehicle. The confirmation output member is configured to output, with respect to the occupant present in the vehicle, a confirmation as to whether outputting of the simulation related to the traveling performance control function provided for the vehicle is permitted. The processor is configured to output the simulation related to the traveling performance control function in a case where the outputting of the simulation is permitted on the basis of the confirmation outputted by the confirmation output member. The processor is configured not to output the simulation related to the traveling performance control function in a case where the outputting of the simulation is not permitted on the basis of the confirmation outputted by the confirmation output member.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is an explanatory diagram describing an example of a virtual experience pattern to be outputted by the output control described in FIG. 4.

FIG. 6 is an explanatory diagram illustrating an example of a display image to be outputted for a second virtual experience pattern described in FIG. 5.

DETAILED DESCRIPTION

Figure 1:
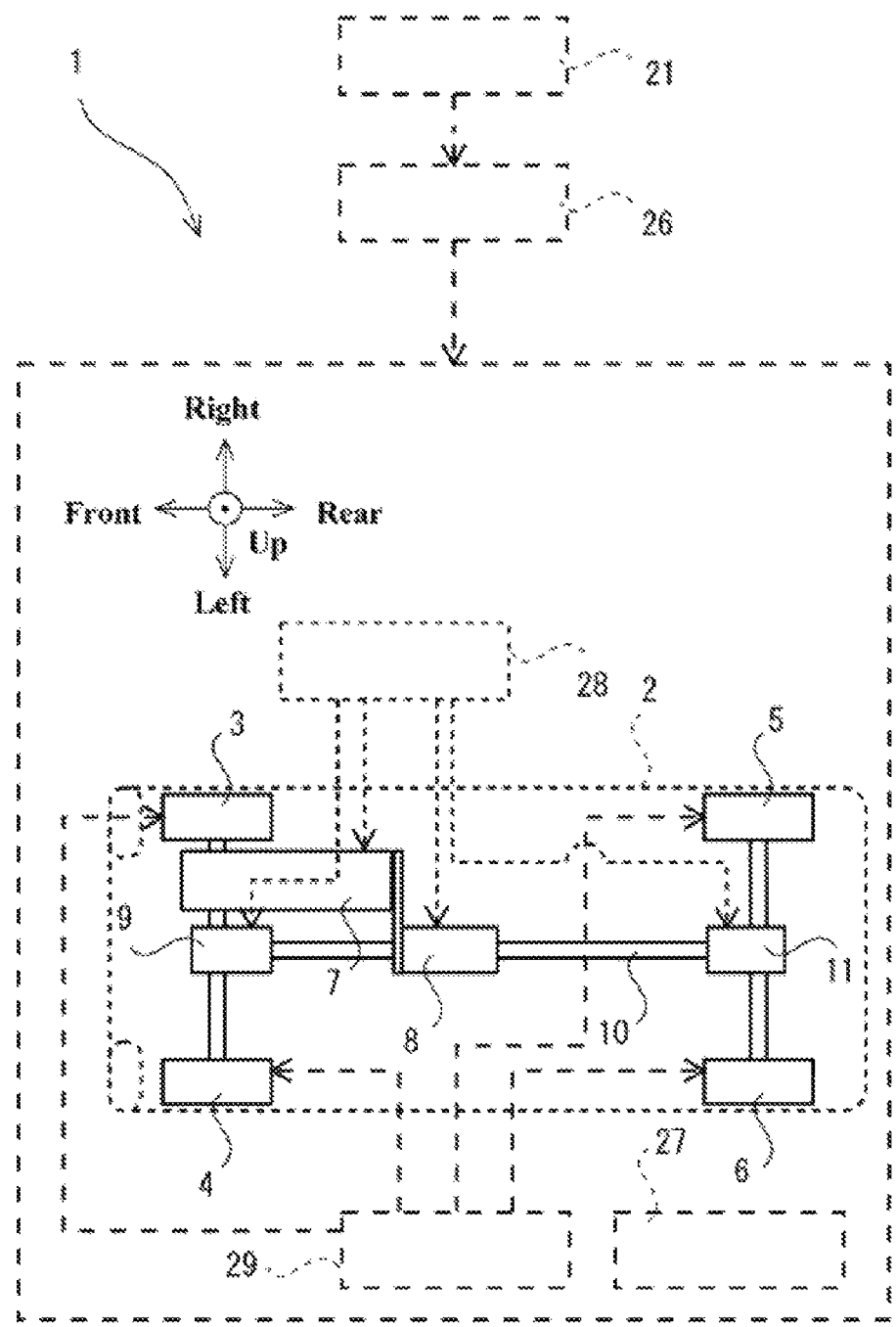
FIG. 1 is an explanatory diagram illustrating a vehicle according to one example embodiment of the disclosure.

Traveling performance control functions may include, for example, a function that is almost constantly operating while a vehicle is traveling, such as an ABS, and a function to be temporarily enabled by an operation performed by an occupant.

For example, a braking-and-driving control apparatus for rough-road traveling of the vehicle may be temporarily enabled by an operation performed by an occupant. In this case, upon actually starting rough-road traveling or during rough-road traveling, the occupant is to perform, on the vehicle, an operation for enabling the braking-and-driving control apparatus for rough-road traveling.

However, the occupant may not be able to appropriately perform the operation for enabling a traveling performance control function when necessary. For example, the occupant may not know or may forget that the vehicle which the occupant is present in has the traveling performance control function. Even if the occupant is aware that the vehicle has the traveling performance control function, the occupant may not be able to appropriately determine a situation to enable the traveling performance control function.

It is desirable to provide a vehicle traveling performance control function simulation apparatus that allows for appropriate use of a traveling performance control function for a vehicle that is to be enabled by an operation performed by an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating a vehicle 1 according to a first example embodiment of the disclosure. FIG. 1 is a top perspective view of the vehicle 1. FIG. 1 illustrates a driving system of the vehicle 1 and various control devices configured to control the driving system.

The vehicle 1 may be, for example, an automobile. Examples of the vehicle 1 may include a bus, a truck, and a motorcycle other than the automobile. The vehicle 1 may be configured to travel with wheels in contact with the ground.

The vehicle 1 illustrated in FIG. 1 may include a vehicle body 2. A front portion of the vehicle body 2 may be provided with a driving unit 7. The driving unit 7 may include a driving force source, a transmission, and a motor that are integrally provided. The driving force source may include, for example, an engine. A middle portion of the vehicle body 2 may be provided with a vehicle compartment. An occupant may get in the vehicle compartment and perform an operation for controlling traveling of the vehicle 1 in the vehicle compartment.

Wheels may be provided on the left and right sides of the vehicle body 2 of the vehicle 1. The wheels may be arranged in the front and the rear on the left and right sides of the vehicle body 2. The wheels may include a right-front wheel 3, a left-front wheel 4, a right-rear wheel 5, and a left-rear wheel 6.

Driving force generated by the driving unit 7 may be transmitted to the right-rear wheel 5 and the left-rear wheel 6 via a center differential gear 8, a propeller shaft 10, and a rear differential gear 11. The driving force generated by the driving unit 7 may be transmitted also to the right-front wheel 3 and the left-front wheel 4 via the center differential gear 8 and a front differential gear 9.

For example, the center differential gear 8, the front differential gear 9, and the rear differential gear 11 may each be provided with a viscous limited slip differential (LSD) or a torque-sensitive LSD.

The front differential gear 9 may lock the driving force transmitted to the right-front wheel 3 and the driving force transmitted to the left-front wheel 4 so that the driving force transmitted to the right-front wheel 3 and the driving force transmitted to the left-front wheel 4 become equivalent to each other. The front differential gear 9 may make a difference between the driving force transmitted to the right-front wheel 3 and the driving force transmitted to the left-front wheel 4 to absorb slipping.

The rear differential gear 11 may lock the driving force transmitted to the right-rear wheel and the driving force transmitted to the left-rear wheel 6 so that the driving force transmitted to the right-rear wheel 5 and the driving force transmitted to the left-rear wheel 6 become equivalent to each other. The rear differential gear 11 may make a difference between the driving force transmitted to the right-rear wheel 5 and the driving force transmitted to the left-rear wheel 6 to absorb slipping.

The center differential gear 8 may lock the driving force transmitted to the right-front wheel 3 and the left-front wheel 4 via the front differential gear 9 and the driving force transmitted to the right-rear wheel 5 and the left-rear wheel 6 via the rear differential gear 11. The center differential gear 8 may make a difference between the driving force transmitted to the right-front wheel 3 and the left-front wheel 4 via the front differential gear 9 and the driving force transmitted to the right-rear wheel 5 and the left-rear wheel 6 via the rear differential gear 11.

Such a traveling performance suppression operation by the center differential gear 8, the front differential gear 9, and the rear differential gear 11 makes it possible for the vehicle 1 to, for example, upon turning on a dry pavement, absorb a difference between wheels positioned on the inner side of the turning and wheels positioned on the outer side of the turning. As a result, it is possible for the vehicle 1 to stably travel and trace an intended traveling path.

Figure 2:
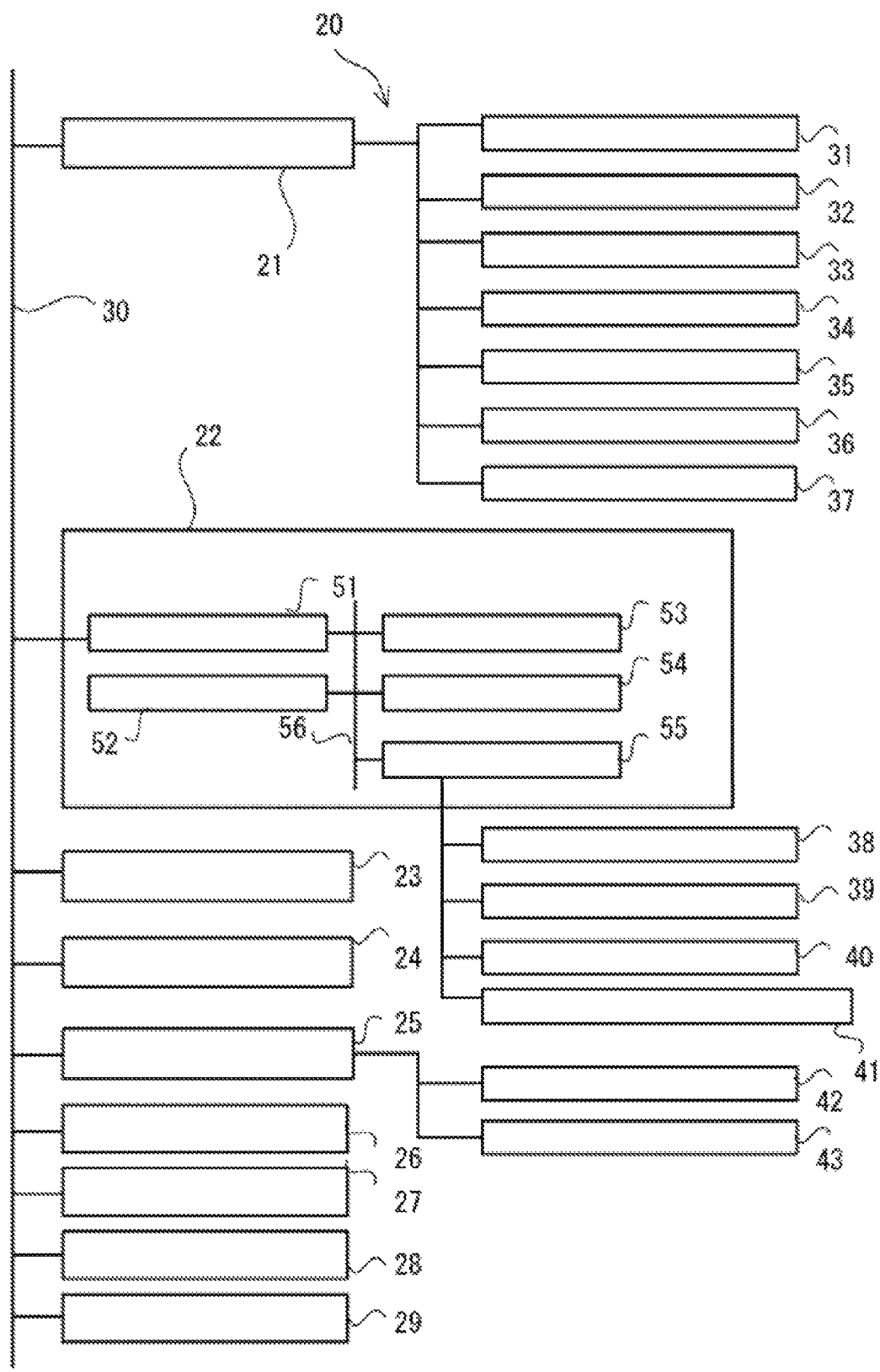
FIG. 2 is an explanatory diagram illustrating a control system serving as a simulation apparatus related to a traveling performance control function for rough-road traveling in the vehicle illustrated in FIG. 1.

FIG. 2 is an explanatory diagram illustrating a control system 20 serving as a simulation apparatus related to a traveling performance control function for rough-road traveling in the vehicle 1 illustrated in FIG. 1. In one embodiment, the control system 20 may serve as a "vehicle traveling performance control function simulation apparatus".

The control system 20 illustrated in FIG. 2 may include an operation detection device 21, a user interface (UI) control device 22, a navigation device 23, an external communication device 24, a seat control device 25, a traveling control device 26, a steering control device 27, a driving control device 28, a braking control device 29, and a vehicle network 30. The operation detection device 21, the user interface control device 22, the navigation device 23, the external communication device 24, the seat control device 25, the traveling control device 26, the steering control device 27, the driving control device 28, and the braking control device 29 may be coupled to the vehicle network 30.

In one example, the vehicle network 30 may be a wired communication network for the vehicle 1 compatible with, for example, a controller area network (CAN) or a local interconnect network (LIN). In another example, the vehicle network 30 may be a communication network such as a local area network (LAN). In still another example, the vehicle network 30 may be any combination of the above-described networks. In one example, the vehicle network 30 may partially include a wireless communication network. The above-described various control devices coupled to the vehicle network 30 may mutually transmit and receive data via the vehicle network 30. In one example, the data transmitted and received via the vehicle network 30 may be encrypted and may be transmitted and received via the vehicle network 30 as packet data to which a transmission source ID and a destination ID are added.

Coupled to the operation detection device 21 may be various vehicle inside members to be used by an occupant who is present in the vehicle 1 to drive the vehicle 1. Here, an ignition switch 31, a steering sensor 32, an accelerator pedal 33, a brake pedal 34, a shift lever 35, a side brake lever 36, and an X-mode button 37 may be coupled to the operation detection device 21.

The ignition switch 31 may be a vehicle inside member to be operated by the occupant in a case of starting the driving unit 7 and thereby starting the traveling of the vehicle 1.

The steering sensor 32 may be a vehicle inside member that detects an operation performed on a steering wheel 67. The steering wheel 67 may be operated by the occupant with his or her both arms to change a traveling direction of the vehicle 1. In one example, the steering sensor 32 may detect that the occupant is holding the steering wheel 67 with his or her both hands.

The accelerator pedal 33 may be a vehicle inside member to be operated by the occupant with his or her foot to accelerate the vehicle 1.

The brake pedal 34 may be a vehicle inside member to be operated by the occupant with his or her foot to decelerate the vehicle 1.

The shift lever 35 may be a vehicle inside member to be operated by the occupant with his or her hand to change a speed reducing ratio of the driving unit 7 of the vehicle 1.

The side brake lever 36 may be a vehicle inside member to be operated by the occupant with his or her hand to decelerate the vehicle 1.

The X-mode button 37 may be a vehicle inside member configured to switch a control related to traveling performance of the driving system of the vehicle 1 between a normal control and a rough-road traveling control. The normal control may achieve traveling performance suitable for normal traveling, for example, traveling on a dry pavement. The rough-road traveling control may achieve traveling performance suitable for rough-road traveling.

Upon traveling on a rough road, the occupant may operate the X-mode button 37 to enable the traveling performance control function for rough-road traveling. As a result, the traveling performance control function for rough-road traveling may be enabled, and the control system of the vehicle 1 may control the driving system by the rough-road traveling control.

In one example, the rough-road traveling control may be automatically disabled and cancelled, for example, in a case where the vehicle speed reaches a predetermined value or higher. As a result, the control system 20 of the vehicle 1 may switch the control for the driving system from the rough-road traveling control to the normal control.

The operation detection device 21 may acquire information regarding an operation performed by the occupant on any of the various vehicle inside members for controlling the traveling of the vehicle 1. The operation detection device 21 may supply a detected value having a value corresponding to an operation amount to any other control device of the control system 20 via the vehicle network 30. In one example, the operation detection device 21 may supply a detected value, which is a value obtained by processing a value acquired from the coupled vehicle inside member, to any other control device of the control system 20 via the vehicle network 30.

Coupled to the user interface control device 22 may be, for example, various vehicle inside members to be used by the occupant, who is present in the vehicle 1, to operate the vehicle 1. Here, coupled to the user interface control device 22 may be a meter panel 38, a center operation panel 39, a speaker 40, and a steering actuator 41.

The meter panel 38 may be a display device provided in front of an occupant who drives the vehicle 1. In one example, the meter panel 38 may be a liquid crystal display device. For example, the meter panel 38 may display a speed, a control state, and any other information regarding the traveling vehicle 1. The occupant may be able to recognize a traveling state of the vehicle 1 on the basis of contents displayed on the meter panel 38.

The center operation panel 39 may be a display device provided in a front portion of the vehicle compartment of the vehicle 1. In one example, the center operation panel 39 may include a combination of a liquid crystal display device and a touch panel. In one example, the center operation panel 39 may display various setting screens related to the vehicle 1 in an operable manner or may display a multimedia content such as a moving image in an operable manner.

The speaker 40 may be a sound output device provided in the vehicle compartment of the vehicle 1. In one example, the speaker 40 may output sounds related to the speed of the vehicle 1, the control state of the vehicle 1, a control switching guidance, the multimedia content, and any other information.

The steering actuator 41 may be an actuator that forcibly vibrates or rotates the steering wheel 67. In a case where the steering wheel 67 is a by-wire steering wheel, a rotation direction and a rotation amount of the steering wheel 67 may be detectable, for example, by a motor. In this case, it may be possible to forcibly vibrate or rotate the steering wheel 67 by supplying a driving signal to the motor related to the steering wheel 67. The motor related to the steering wheel 67 may serve as the steering actuator 41.

The user interface control device 22 may include a control port 55, an input/output unit 51, a timer 52, a memory 53, an electronic control unit (ECU) 54, and an internal bus 56. Various vehicle inside members for operating the vehicle 1 may be coupled to the control port 55. The input/output unit 51 may be coupled to the vehicle network 30. The timer 52 may measure a time period or a time. The control port 55, the input/output unit 51, the timer 52, the memory 53, and the ECU 54 may be coupled to the internal bus 56. The various devices illustrated in FIG. 2 other than the user interface control device 22 may have a similar configuration.

The memory 53 may include: a semiconductor memory such as a solid state drive (SSD); a hard disk drive (HDD); and a random-access memory (RAM). The memory 53 may hold, in a non-volatile manner, a program to be executed by the ECU 54 and data.

In addition, the memory 53 may be provided with a work area to be used by the ECU 54 upon executing the program.

The ECU 54 may read the program from the memory 53 and execute the read program. Thus, the ECU 54 may serve as a controller of the user interface control device 22. In one embodiment, the ECU 54 may serve as a "processor".

The ECU 54 serving as the controller of the user interface control device 22 may, for example, acquire, from the control port 55, information regarding an operation performed by an occupant on the vehicle inside member. The ECU 54 may generate a detected value having a value corresponding to the operation, and may supply the generated detected value to any of the other control devices of the control system 20 from the input/output unit 51 via the vehicle network 30. In one example, the operation detection device 21 may generate a detected value obtained by processing the value acquired from the vehicle inside member and may supply the generated detected value to any of the other control devices of the control system 20 from the input/output unit 51 via the vehicle network 30.

The navigation device 23 may include, for example, high-resolution map data. For example, the navigation device 23 may search for a guidance route from a current location on the basis of a setting such as a destination set by means of the center operation panel 39. The current location may be obtained, for example, by radio waves received from a global navigation satellite system (GNSS) satellite. The navigation device 23 may display, on the center operation panel 39, a guide map regarding the guidance route to the searched destination. In one example, the navigation device 23 may update the guide map displayed on the center operation panel 39 in accordance with a movement of the own vehicle. Thus, the occupant may be able to so drive the vehicle 1 that the vehicle 1 travels in accordance with the guidance route from the current location to the destination that is set while the vehicle 1 is parked and stopped.

The external communication device 24 may establish a wireless communication path, for example, for an unillustrated base station that is located outside the vehicle 1. By means of the established wireless communication path, the external communication device 24 may perform transmission and reception of information with an unillustrated server which is communicable via the base station. In one example, under a control by the navigation device 23, the external communication device 24 may transmit, to the server, information regarding the current location and the destination of the own vehicle, and may acquire, from the server, information regarding the guidance route to the destination accordingly. In addition, in one example, the external communication device 24 may communicate with a server that supplies weather information and traffic information to the vehicle 1. The external communication device 24 may thus receive the weather information and the traffic information.

The seat control device 25 may control, for example, a position and an attitude of a seat provided in the vehicle compartment of the vehicle 1. Coupled to the seat control device 25 may be a lumbar support 42 and a seat actuator 43.

The seat actuator 43 may control, for example, a front-rear position, a height, and an inclination of a seating part 61 of a seat. In one example, the seat actuator 43 may further control an inclination of a back part 62 of the seat.

The lumbar support 42 may include, for example, a pair of support plates provided on the left and right sides of a lower portion of the back part 62 of the seat. The pair of support plates may be provided on the left and right sides of a hip of an occupant who is seated on the seating part 61 of the seat. The lumbar support 42 may individually control the direction of each of the support plates and cause the support plates to be in contact, from the left and right sides, with the hip of the occupant who is seated on the seating part 61 of the seat. This helps to prevent the hip of the occupant who is seated on the seating part 61 of the seat from easily displaced from the seated position. As a result, the posture of the occupant is stabilized.

The steering control device 27 may acquire a control value related to steering from the vehicle network 30, and may change the directions of the respective wheels of the vehicle 1 in accordance with the acquired control value. The steering control device 27 may thus control the traveling direction of the vehicle 1.

The driving control device 28 may acquire a control value related to driving from the vehicle network 30, and may control an operation of the driving unit 7, which applies driving force to the wheels of the vehicle 1, in accordance with the acquired control value. The driving control device 28 may thus control the driving force applied to the wheels of the vehicle 1.

The braking control device 29 may acquire a control value related to braking from the vehicle network 30, and may control braking force applied to the wheels of the vehicle 1 in accordance with the acquired control value. The braking control device 29 may thus control the braking force applied to the wheels of the vehicle 1.

The control devices of the driving system including, without limitation, the steering control device 27, the driving control device 28, and the braking control device 29 may control respective operations of the center differential gear 8, the rear differential gear 11, and the front differential gear 9. For example, the driving control device 28 may control respective operations of the center differential gear 8, the rear differential gear 11, and the front differential gear 9.

In a normal case where the X-mode is not enabled, the driving control device 28 may control the respective operations of the center differential gear 8, the rear differential gear 11, and the front differential gear 9 to be suitable, for example, for a road surface of a dry pavement. In a case where the X-mode is enabled, the driving control device 28 and the braking control device 29 may control the driving force and the braking force applied to the wheels individually for each of the wheels while the vehicle 1 is traveling on a rough road. Thus, the control devices of the driving system may be able to suppress rotation of the wheel that is idling above the road surface or to reduce a distribution amount of the driving force, for example. The control devices of the driving system may be able to concentrate the driving force on a wheel that is not positioned above the road surface or a wheel that is not slipping with respect to the road surface. As a result, the vehicle 1 is able to stably travel even on a rough road, capturing the road surface. In addition, the vehicle 1 is prevented from being stuck easily due to irregularity of a rough road. Even if the vehicle 1 is stuck, the vehicle 1 is able to get out more easily.

As illustrated in FIG. 1, the traveling control device 26 may supply, to the steering control device 27, the driving control device 28, and the braking control device 29, a control value corresponding to an operation of an occupant detected by the operation detection device 21. In one example, the traveling control device 26 may supply a control value corresponding to a direction and an amount of the operation performed by the occupant. In another example, the traveling control device 26 may supply a control value for drive assistance obtained by adjusting such a control value. In addition, the traveling control device 26 may output a control value based on automatic driving that is not based on the operation performed by the occupant. The automatic driving may be enabled, for example, in a particular traveling environment or on all roads.

Figure 3:
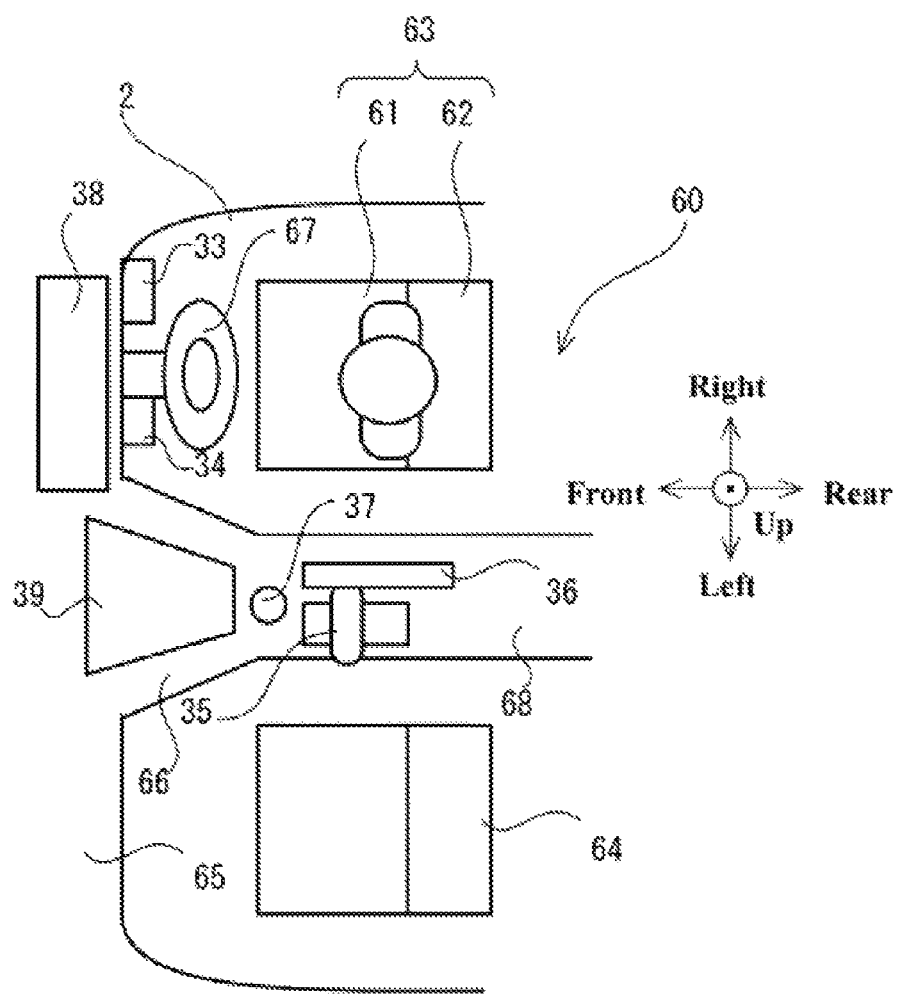
FIG. 3 is an explanatory diagram illustrating an arrangement of various vehicle inside members provided in a vehicle compartment of the vehicle illustrated in FIG. 1 for the control system illustrated in FIG. 2.

FIG. 3 is an explanatory diagram illustrating an arrangement of various vehicle inside members provided in the vehicle compartment of the vehicle 1 illustrated in FIG. 1 for the control system 20 illustrated in FIG. 2.

FIG. 3 illustrates a portion of the vehicle compartment of the vehicle 1.

In the vehicle compartment illustrated in FIG. 3, a driver's seat 63 and a passenger's seat 64 may be disposed side by side in a left-right direction.

Provided between the driver's seat 63 and the passenger's seat 64 may be a center console 68.

Provided in front of the driver's seat 63 and the passenger's seat 64 may be a dashboard 65. Provided between the dashboard 65 and the center console 68 may be a center panel 66.

A driver may be seated on the seating part 61 of the driver's seat 63 and may be present in the vehicle 1 in a posture in which the driver's back is in contact with the back part 62 of the driver's seat 63.

Under the feet of the driver seated on the driver's seat 63, the accelerator pedal 33 and the brake pedal 34 may be disposed side by side in the left-right direction.

Disposed in the center console 68 may be the shift lever 35, the side brake lever 36, and the X-mode button 37. The center panel 66 may be provided with the center operation panel 39. The driver who is seated on the driver's seat 63 may be able to stretch his or her arm to operate these vehicle inside members.

The steering wheel 67 may protrude from the dashboard 65 to the rear side, toward the driver's seat 63. The meter panel 38 may be provided at a portion of the dashboard 65 that is in front of the driver's seat 63. The driver who is seated on the driver's seat 63 may be able to hold the steering wheel 67 with his or her both hands. The driver may be able to drive the vehicle 1 by operating members including, without limitation, the steering wheel 67, the accelerator pedal 33, and the brake pedal 34 while visually checking a region in front of the vehicle 1 and the meter panel 38.

It is possible for the driver to operate the vehicle inside members of the vehicle 1 without visually checking the vehicle inside members in a state where the driver is seated at his or her own seating position in the vehicle 1 and relaxed.

In some cases, the vehicle 1 may travel not only on a dry pavement but on a rough road with a smaller coefficient of friction on a road or on a rough road with an inclination or irregularity. In a case of traveling in such a situation, the driver may be expected to operate the X-mode button 37. In the X-mode, the controls of the control devices of the driving system including the steering control device 27, the driving control device 28, and the braking control device 29 may be switched from a normal control to a rough-road traveling control. In this case, the distribution of the driving force to the wheels may be controlled, and braking for each of the wheels may be performed on an as-needed basis. This makes it possible to apply effective traction to the wheel that may require such traction. As a result, running through performance of the vehicle 1 greatly improves.

However, upon causing the vehicle 1 to travel, an occupant such as a driver often operates the vehicle 1 and causes the vehicle 1 to travel not in the X-mode but under a normal control. For this reason, some occupants may not be able to determine a traveling environment for which the occupant is to operate the X-mode button 37. The occupant may forget that the vehicle 1 has the X-mode. The occupant may not be able to determine that the vehicle 1 is traveling on a road surface suitable for the X-mode even if the vehicle 1 is traveling on such a road surface. Further, even if the occupant gets used to the X-mode when the occupant purchases the vehicle 1 as a new vehicle or when the occupant takes part in a demonstration event, the occupant may forget upon actual traveling the sense which the occupant once has obtained. It is assumable that the occupant is basically not used to the operation of the X-mode button 37.

Although the vehicle 1 has high traveling performance for a rough road, the use of such traveling performance may not be promoted. This may be an issue to be solved in order to improve traveling safety of the vehicle 1.

Note that it may be difficult to constantly enable the X-mode while the vehicle 1 is traveling. The traveling control device 26 of the vehicle 1 may basically control the traveling for a dry pavement as a standard condition. For example, in a case of drive assistance or automatic driving, deviation of an actual traveling path of the vehicle 1 from a scheduled traveling path set by the control may influence safety in the control. Therefore, although the traveling control may differ depending on the setting of the vehicle 1, the traveling control device 26 of the vehicle 1 may not be configured to constantly execute the traveling control in the X-mode. The operation performed on the X-mode button 37 by the occupant may be technically expected. In contrast, the traveling control function such as the ABS may be desirably enabled also on a dry pavement. Therefore, it is not necessary to enable the traveling control function such as the ABS by a button operation performed by the occupant.

For example, in the X-mode, the center differential gear 8 may be locked. In a case where the vehicle 1 turns left or right at an intersection while the center differential gear 8 is locked, pushing-under occurs during the traveling of the vehicle 1. This may cause the vehicle 1 to easily deviate to the outer side from the desired traveling path for turning left or right. The vehicle body 2 may vibrate while the vehicle 1 is traveling. In contrast, if the center differential gear 8 is not locked, the center differential gear 8 may be able to absorb the difference between the wheels positioned on the inner side and the wheels positioned on the outer side upon turning left or right. Accordingly, the vehicle 1 may be able to travel along the desired traveling path for turning left or right.

Note that the X-mode may be a traveling control function for rough-road traveling. Therefore, the X-mode may be automatically disabled, for example, in a case where the vehicle speed reaches a predetermined threshold or higher. It may not be necessary for the occupant to operate the X-mode button 37 to perform an operation of canceling the X-mode.

Figure 4:
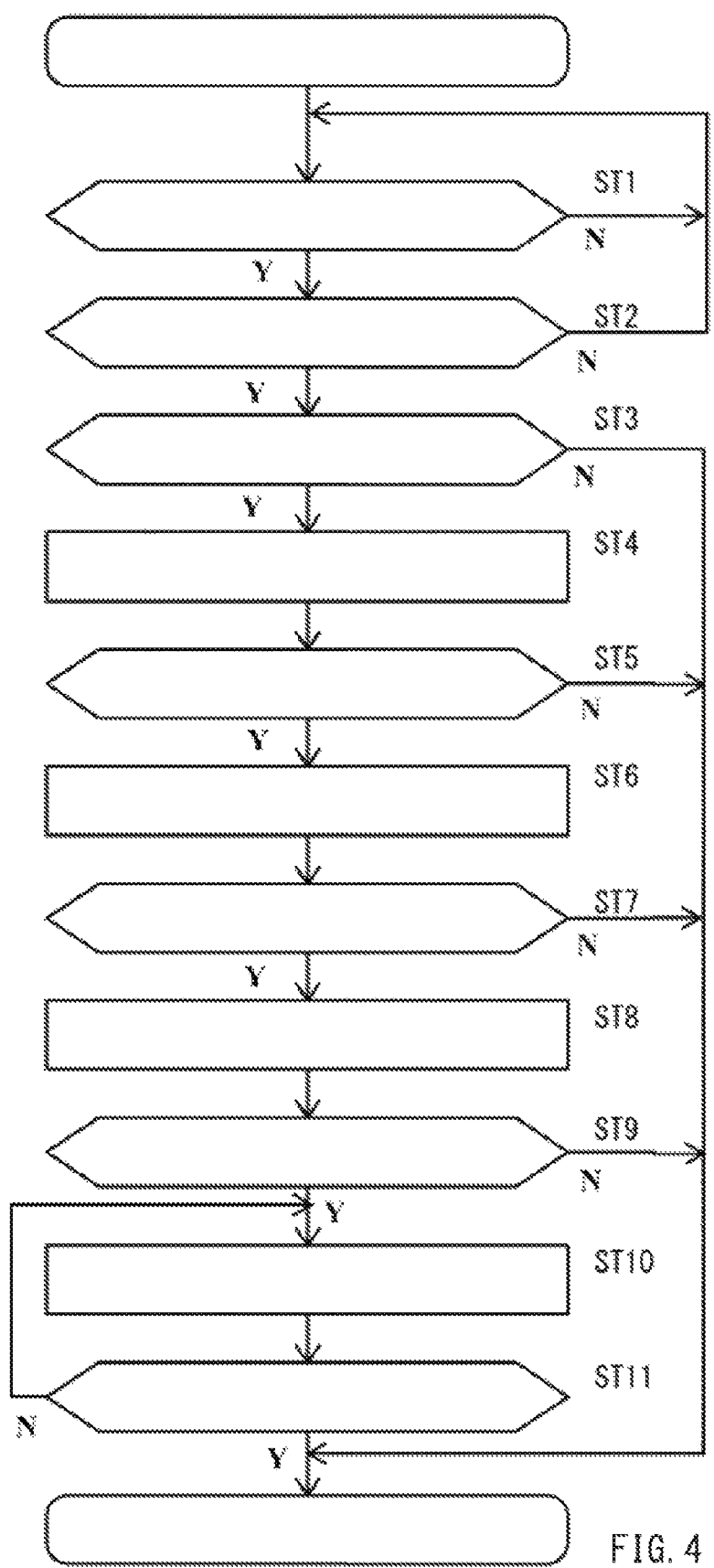
FIG. 4 is a flowchart describing an example of an output control of a simulation related to the traveling performance control function for rough-road traveling to be performed by an ECU illustrated in FIG. 2.

FIG. 4 is a flowchart describing an example of an output control of a simulation related to the traveling performance control function for rough-road traveling to be performed by the ECU 54 illustrated in FIG. 2.

In the first example embodiment, the ECU 54, as the controller, of the user interface control device 22 may repeatedly execute the output control of the simulation described in FIG. 4. The ECU 54 may output a simulation related to the X-mode for the vehicle 1 with use of the above-described various vehicle inside members that are provided around an occupant who drives the vehicle 1.

Accordingly, the vehicle 1 may be able to output the simulation related to the X-mode. The X-mode may be the traveling performance control function for rough-road traveling that is provided for the own vehicle and is to be enabled by an operation performed by an occupant.

In step ST1, performed may be a process of determining whether an occupant is present in the vehicle 1. For example, the ECU 54 may determine that the occupant is present in the vehicle 1 and is seated on the driver's seat 63, for example, on the basis of opening and closing of an unillustrated door of the vehicle 1 or an image captured by an unillustrated in-vehicle camera. For example, the ECU 54 may determine that the occupant is present in the vehicle 1 and is seated on the driver's seat 63 on the basis of an occupant operation or an operating state of an unillustrated pressure-sensitive sensor provided on the driver's seat 63 or of the seat actuator 43. If the ECU 54 determines that the occupant is not present in the vehicle 1 (step ST1: N), the ECU 54 may repeat the process in step ST1. If the occupant is present in the vehicle 1 (step ST1: Y), the ECU 54 may cause the process to proceed to step ST2.

In step ST2, performed may be a process of determining whether the ignition switch 31 is turned on. Upon causing the vehicle 1 to travel, a driver may operate the ignition switch 31 that is in an OFF state to bring the ignition switch 31 in an ON state to start, for example, the engine of the driving unit 7. If the ignition switch 31 is brought into the ON state (step ST2: Y), the ECU 54 may cause the process to proceed to step ST3. If the ignition switch 31 is not brought into the ON state (step ST2: N), the ECU 54 may cause the process to return to step ST1.

In step ST3, performed may be a process of determining that the vehicle 1 is in a parked state or in a non-started state. In one example, the ECU 54 may acquire occupant operation detection information and thereby determine that the vehicle 1 is in the parked state or in the non-started state. For example, in a case where the vehicle 1 is parked and stopped and the side brake lever 36 is in an operating state, or in a case where the shift lever 35 is set in the P range for parking, the ECU 54 may determine that the vehicle 1 is in the parked state or in the non-started state. For example, the ECU 54 may determine that the vehicle 1 is in a non-traveling state or in a non-startable state on the basis of an operation state of the vehicle inside member that is provided in the vehicle 1 for driving the vehicle 1. For example, in a case where the vehicle speed of the vehicle 1 is 0 km/h, the ECU 54 may determine that the vehicle 1 is in the parked state or in the non-started state. If the vehicle 1 is in the parked state or in the non-started state (step ST3: Y), the ECU 54 may cause the process to proceed to step ST4. In other cases (step ST3: N), the ECU 54 may end this control. In a case where the occupant starts to cause the vehicle 1 to travel immediately after the occupant gets in the vehicle 1, the ECU 54 may end this control without outputting a simulation.

In step ST4, performed may be a process of acquiring traveling schedule information regarding the vehicle 1. In one example, the ECU 54 may acquire, for example, from the navigation device 23, information regarding the set destination or road surface information regarding a route generated by the navigation device 23. In one example, the ECU 54 may transmit the information regarding the destination acquired from the navigation device 23 to the server via the external communication device 24, and may acquire the road surface information regarding the route to the destination from the server.

Examples of the road surface information may include information regarding whether each section of the route is a pavement and information regarding a rough-road possibility of each section. In one example, the road surface information may include information regarding the number, the size, and any other factor of curves in a section. The navigation device 23 may basically include map data and may search for the route to the destination with use of the map data. The map data may include, for example, data regarding roads and any other data. The map data may often include information regarding, for example, a shape of a road, presence or absence of a pavement, and presence or absence of a traffic light. In one example, the ECU 54 may acquire the map data regarding the route itself from the navigation device 23.

In one example, the ECU 54 may acquire, from the server, weather information regarding the route from the current location to the destination, weather information regarding a region of the destination, traffic information, information regarding locations and the number of times of rescue service dispatch for the vehicle 1 on the route, and any other information.

In one example, the ECU 54 may acquire information regarding a simulation output history in the past together with the traveling schedule information regarding the vehicle 1. In one example, the information regarding the simulation output history may be stored and recorded in the memory 53 in such a manner that the information is to be updated by outputting the simulation. The information regarding the simulation output history may include, for example, a final output date and time, the accumulated number of times of output, and any other information. In one example, the ECU 54 may acquire the operation history of the X-mode that is stored and recorded in the memory 53.

In step ST5, performed may be a process of determining whether there is a possibility of traveling on a rough road on the basis of the traveling schedule information acquired in step ST4.

For example, in a case where the road surface information regarding the route has been acquired, the ECU 54 may determine whether the route includes a non-pavement road. Here, for example, a section in which the vehicle 1 travels off the road may be regarded as the non-pavement road. In this case, the ECU 54 may determine that there is a possibility of traveling on a rough road in a section that is possibly the non-pavement road.

In addition, for example, in a case where there is a possibility of heavy rain, a frozen condition, or snow accumulation, the ECU 54 may determine that there is a possibility of traveling on a rough road in the section.

In addition, for example, in a case where the route includes a location to which the rescue service has been dispatched for the vehicle 1, or in a case where the number of times of the rescue service dispatch to the location exceeds a threshold, the ECU 54 may determine that there is a possibility of traveling on a rough road in a section including such a dispatch location.

In addition, for example, in a case where there is a section in which the number of curves is a predetermined number or greater, the ECU 54 may determine that there is a possibility of traveling on a rough road in a section including the curves.

In addition, for example, in a case where a predetermined period has elapsed from the latest output date and time regarding the outputting of the simulation, or in a case where the cumulative number of times of outputting the simulation is a predetermined value or less, the ECU 54 may forcibly determine that there is a possibility of traveling on a rough road. In a case where the number of times of the operation in the X-mode is a threshold or less, the ECU 54 may forcibly determine that there is a possibility of traveling on a rough road.

If there is a possibility of traveling on a rough road (step ST5: Y), the ECU 54 may cause the process to proceed to step ST6. In other cases (step ST5: N), the ECU 54 may end this control. In a case where the occupant is used to the X-mode or in a case where the occupant has recently experienced the simulation output, the ECU 54 may end this control without outputting the simulation.

In step ST6, performed may be a process of outputting a permission confirmation screen related to virtual experience output for rough-road traveling. The ECU 54 may output the permission confirmation screen related to the virtual experience output to the center operation panel 39 and cause the center operation panel 39 to display the permission confirmation screen related to the virtual experience output. Thus, in a case where there is a possibility that the vehicle 1 is to travel on a rough road, it is possible to output, to the center operation panel 39, a confirmation as to whether outputting of the simulation related to the traveling performance control function for rough-road traveling provided for the vehicle 1 is permitted. In one embodiment, the center operation panel 39 may serve as a "confirmation output member". It is possible for an occupant present in the vehicle 1 to visually recognize the permission confirmation screen related to the virtual experience output. The occupant may perform, on the center operation panel 39, an operation of giving permission or not giving permission for the virtual experience output.

In step ST7, performed may be a process of determining whether the occupant has given permission for the virtual experience output for rough-road traveling in accordance with the output of the permission confirmation screen. The ECU 54 may acquire a result of the operation performed on the center operation panel 39 by the occupant. If the virtual experience output is permitted (step ST7: Y), the ECU 54 may cause the process to proceed to step ST8. In other cases (step ST7: N), the ECU 54 may end this control. In a case where the occupant determines that the virtual experience of the simulation output is not necessary for some reason, the ECU 54 may end this control without outputting the simulation. If the occupant does not give permission for the outputting of the simulation, the ECU 54 may end this control without outputting the simulation. However, even in such a case, the occupant will be certainly reminded that the vehicle 1 has the X-mode for rough-road traveling. It is expectable that the occupant will operate the X-mode button 37 in a case where the subsequent traveling involves a rough road.

In step ST8, performed may be a process of acquiring the occupant operation detection information. Even if the occupant performs an operation of giving permission for outputting of the simulation, the occupant may start causing the vehicle 1 to travel immediately after such an operation. Time has elapsed at a timing at which the ECU 54 performs the process in step ST8 since a timing at which the ECU 54 performs the process in step ST3. For this reason, the ECU 54 may newly acquire the latest occupant operation detection information.

In step ST9, performed may be a process of determining whether the vehicle 1 remains in a non-travelable state on the basis of the occupant operation detection information acquired in step ST8. For example, in a case where the vehicle 1 is parked and stopped and the side brake lever 36 is in an operating state, or in a case where the shift lever 35 is set in the P range for parking, the ECU 54 may determine that the vehicle 1 is in a non-traveling state or in a non-startable state. In one example, the ECU 54 may determine whether the vehicle 1 remains in the non-travelable state on the basis of the latest operation state of the vehicle inside member that is provided in the vehicle 1 for driving the vehicle 1. If the ECU 54 determines that the vehicle 1 remains in the non-travelable state (step ST9: Y), the ECU 54 may cause the process to proceed to step ST10. In other cases (step ST9: N), the ECU 54 may end this control. In a case where the occupant has started to cause the vehicle 1 to travel although the occupant has given permission for outputting of the simulation, the ECU 54 may end this control without outputting the simulation.

In a case where the vehicle 1 has started traveling or is to start traveling, the ECU 54 may forcibly stop the traveling of the vehicle 1 or forcibly prevent the vehicle 1 from start traveling. As a result, the vehicle 1 may remain in the non-travelable state.

In step ST10, performed may be a process of outputting a virtual experience pattern for rough-road traveling. The ECU 54 may read the virtual experience pattern for rough-road traveling recorded in the memory 53, and may start outputting the virtual experience pattern for rough-road traveling.

In step ST11, performed may be a process of determining whether the outputting of the pattern is to end. In one example, the ECU 54 may determine not only that the outputting of the virtual experience pattern itself is ended, but also whether the occupant has performed an ending operation or a suspending operation, for example, on the center operation panel 39. If the ending operation or the suspending operation has not been performed (step ST11: N), the ECU 54 may cause the process to return to step ST10. As a result, the outputting of the virtual experience pattern for rough-road traveling in step ST10 may be continued. If the outputting of the virtual experience pattern itself is ended, or if the ending operation or the suspending operation is performed (step ST11: Y), the ECU 54 may end this control. In the above-described manner, it is possible for the occupant to virtually experience rough-road traveling in the own vehicle that he or she uses daily.

FIG. 5 is an explanatory diagram describing an example of a virtual experience pattern to be outputted by the output control described in FIG. 4.

FIG. 5 describes, as examples: a first pattern for simulating a traveling situation in which the vehicle 1 is stuck after the wheel slips on a rough road; and a second pattern for simulating a traveling situation in which the wheel runs over an obstacle, the vehicle 1 decelerates, and the vehicle 1 is stuck on a rough road.

Each of the patterns described in FIG. 5 may include: information 71 regarding an output moving image for the corresponding traveling situation; and information 72 regarding output contents to be outputted to the various vehicle inside members that are provided around the driver's seat 63. The information 71 and the information 72 may be recorded in the memory 53 or may be acquired from the server.

Note that the virtual experience patterns are not limited to those described in FIG. 5. Possible situations of traveling on a rough road other than those described above may include, for example: slipping on a flat dirt road or a frozen road surface; and slipping on a winding road in heavy rain. In one example, the memory 53 may hold the information 71 and the information 72 regarding virtual experience patterns corresponding to such situations.

In step ST10 described in FIG. 4, the ECU 54 may select one of the patterns described in FIG. 5 and start outputting the selected virtual experience pattern.

Note that the ECU 54 may select and output the patterns in step ST10 described in FIG. 4 in order.

For example, an output moving image for the first pattern may be a moving image for a situation in which the wheel of the vehicle 1 traveling on a rough road slips and the vehicle 1 is stuck. The output moving image may be a moving image obtained by capturing an image of a real vehicle or may be a generated virtual image. In one example, the ECU 54 may generate a virtual moving image with use of polygon data regarding the vehicle 1 recorded in the memory 53. The output moving image may be a moving image for a traveling situation in which the wheel simply slips due to low traction and the vehicle 1 is stuck, or a moving image for a situation in which such a traveling situation is dealt with by the X-mode. In one example, both of such moving images may be outputted. In this case, the moving image for a simulation related to the traveling performance control function and the moving image for a simulation related to the traveling situation in which the traveling performance control function is to be used may be displayed in order on the center operation panel 39.

Further, the ECU 54 may output the output contents for the first pattern in order from the top while the ECU 54 is outputting the output moving image to the center operation panel 39 and thereby displaying the output moving image on the center operation panel 39, or before or after the ECU 54 outputs the output moving image to the center operation panel 39 and thereby displays the output moving image on the center operation panel 39. In order to allow the occupant to virtually experience slipping, the ECU 54 may first output a slipping sound from the speaker 40. Thereafter, in order to allow the occupant to virtually experience an engine roar, the ECU 54 may output an engine blow-up sound from the speaker 40. In addition, in order to allow the occupant to virtually experience an increase in engine speed, the ECU 54 may update a display of a tachometer on the meter panel 38. Thereafter, in order to allow the occupant to virtually experience vibration of the steering wheel 67, the ECU 54 may output vibration from the steering actuator 41. Thereafter, in order to allow the occupant to virtually experience the act of lateral acceleration on the vehicle body 2, the ECU 54 may alternately drive the pair of left and right support plates of the lumbar support 42.

In such a manner, it is possible for the occupant to virtually experience, not only visually but also by movements of the vehicle inside members, vehicle behavior in a situation in which the wheel of the vehicle 1 traveling on a rough road slips and the vehicle 1 is stuck. It is possible for the occupant to virtually experience a rough-road traveling situation by being seated in a usual manner in the own vehicle which the occupant uses daily. The occupant is able to delicately sense even a subtle movement of the vehicle inside member on the basis of that such a movement is different from a usual movement. The occupant is able to delicately sense a change in position of his or her ischial bone while being seated.

An output moving image for the second pattern may be a moving image for a situation in which the wheel of the vehicle 1 traveling on a rough road runs over an obstacle, the vehicle 1 decelerates, and the vehicle 1 is stuck. The output moving image may be a moving image obtained by capturing an image of a real vehicle or may be a generated virtual image. In one example, the ECU 54 may generate a virtual moving image with use of polygon data regarding the vehicle 1 recorded in the memory 53. The output moving image may be a moving image for a traveling situation in which the wheel simply runs over an obstacle, the vehicle 1 decelerates, and the vehicle 1 is stuck, or a moving image for a situation in which such a traveling situation is dealt with by the X-mode. In one example, both of such moving images may be outputted. In this case, the moving image for a simulation related to the traveling performance control function and the moving image for a simulation related to the traveling situation in which the traveling performance control function is to be used may be displayed in order on the center operation panel 39.

Further, the ECU 54 may output the output contents for the second pattern in order from the top while the ECU 54 is outputting the output moving image to the center operation panel 39 and thereby displaying the output moving image on the center operation panel 39, or before or after the ECU 54 outputs the output moving image to the center operation panel 39 and thereby displays the output moving image on the center operation panel 39. In order to allow the occupant to virtually experience the engine roar, the ECU 54 may first output the engine blow-up sound from the speaker 40. Thereafter, in order to allow the occupant to virtually experience an inclination of the vehicle body 2, the ECU 54 may start the seat actuator 43 and thereby vary the position of the seat. In one example, the ECU 54 may vary an angle of the back part 62 with respect to the seating part 61, in addition to the height position and the front-rear position of the seating part 61 of the seat.

In such a manner, it is possible for the occupant to virtually experience, not only visually but also by movements of the vehicle inside members, vehicle behavior in a situation in which the wheel of the vehicle 1 traveling on a rough road runs over an obstacle, the vehicle 1 decelerates, and the vehicle 1 is stuck. It is possible for the occupant to virtually experience a rough-road traveling situation by being seated in a usual manner in the own vehicle which the occupant uses daily. The occupant is able to delicately sense even a subtle movement of the vehicle inside member on the basis of that such a movement is different from a usual movement. The occupant is able to delicately sense a change in seat position.

Note that the vehicle inside members to be used by the ECU 54 to output a simulation are not limited to those described above. For example, the ECU 54 may use any other vehicle inside member such as an unillustrated seatbelt device, an unillustrated member to project light into the vehicle 1, or an unillustrated air conditioning device to output the simulation.

FIG. 6 is an explanatory diagram illustrating an example of a display image to be outputted for the second virtual experience pattern described in FIG. 5.

The ECU 54 may display an output moving image on the center operation panel 39 for the second experience pattern described in FIG. 5.

The ECU 54 may display, on the meter panel 38, the state of the driving system including the wheels of the vehicle 1 as in the case where the vehicle 1 is traveling. In FIG. 6, the ECU 54 may display a slip mark 81 superimposed on the right-rear wheel 5. Among the wheels of the vehicle 1, the wheel which is slipping may be thus highlighted.

Note that the state of the driving system of the vehicle 1 displayed on the meter panel 38 may vary in accordance with the output moving image displayed on the center operation panel 39.

In such a manner, it is possible for the occupant to check the state of the driving system of the vehicle 1 on the meter panel 38 as in the case where the vehicle 1 is traveling. It is possible for the occupant to recognize the details of the vehicle behavior during rough-road traveling on the basis of the display on the meter panel 38.

In addition, by recognizing the output moving image and the display on the meter panel 38 in association with each other, it is possible for the occupant to also recognize a relationship between the vehicle behavior and a situation at each stage of the virtual experience pattern.

As described above, according to the first example embodiment, the vehicle 1 having the traveling performance control function for rough-road traveling to be enabled by an operation performed by an occupant is provided with the processor that outputs the simulation related to the traveling performance control function. In addition, according to the first example embodiment, the simulation related to the traveling performance control function is outputted with use of the vehicle inside member provided around the occupant who is to drive the vehicle 1. As a result, it is possible for the occupant to recognize, for example, an output state of the vehicle inside member, which is provided around the occupant in the vehicle 1, in a case of using the traveling performance control function. It is possible for the occupant to have a simulation experience related to the traveling performance control function for the vehicle 1, which the occupant is present in, and the output state of the vehicle 1 based on the traveling performance control function. Thus, the occupant is able to perform an operation to use the traveling performance control function upon actual traveling of the vehicle 1. In addition, by experiencing a simulation in advance related to the behavior of the vehicle 1, etc. caused by the traveling performance control function, it is possible for the occupant to get used to the behavior of the vehicle 1, etc. in a case where the traveling performance control function is actually used.

In contrast, for example, if such outputting of the simulation is not performed, the occupant may forget about the traveling performance control function that is not used in usual traveling, or even if the occupant remembers the presence of the traveling performance control function, the occupant may not know how to use the traveling performance control function. In such cases, the occupant may not use the traveling performance control function. In addition, the occupant may be surprised at the behavior of the vehicle 1 caused by the traveling performance control function, and may perform, for example, an unnecessary operation that makes the situation worse. According to the first example embodiment, it is possible to update such a state of the occupant's memory or recognition by the simulation in the vehicle 1. As a result, according to the first example embodiment, it is possible to promote appropriate use of the traveling performance control function that is to be enabled by an operation performed by the occupant in the vehicle 1.

For example, according to the first example embodiment, the simulation related to the traveling performance control function is not merely outputted by the processor. First, the confirmation output member outputs a confirmation as to whether outputting of the simulation related to the traveling performance control function is permitted. In a case where the outputting of the simulation is permitted, the processor outputs the simulation related to the traveling performance control function. In a case where the outputting of the simulation is not permitted, the processor does not output the simulation related to the traveling performance control function. Accordingly, for example, an occupant who has used the traveling performance control function for the vehicle 1 and understands how to use the traveling performance control function may not give permission for the outputting of the simulation. This prevents excessive outputting of the simulation. This helps to prevent the occupant from being annoyed about the simulation related to the traveling performance control function. In addition, even in a case where the simulation is not outputted, the occupant is at least asked by the confirmation output member whether the outputting of the simulation related to the traveling performance control function is permitted. As a result, it is possible for the occupant to be certainly reminded of and recognize the traveling performance control function provided for the vehicle 1.

In addition, by experiencing the simulation in the vehicle 1 to be used in actual traveling, the occupant is able to appropriately or timely operate the X-mode button 37 and use the traveling performance control function when it is favorable to actually use the traveling performance control function in a case where the vehicle 1 is actually traveling on a rough road.

For example, according to the first example embodiment, it is possible to output at least the simulation for the traveling situation in which the wheel of the vehicle 1 slips and the vehicle 1 is stuck and the simulation for the traveling situation in which the wheel of the vehicle 1 runs over an obstacle and the vehicle 1 decelerates. Accordingly, it is possible for the occupant to perform an operation matching the traveling performance control function in the traveling situation in which the wheel of the vehicle 1 slips and the vehicle 1 is stuck. In addition, it is possible for the occupant to perform an operation matching the traveling performance control function in the traveling situation in which the wheel of the vehicle 1 runs over an obstacle and the vehicle 1 decelerates.

In addition, according to the first example embodiment, the occupant may be asked whether the outputting of the simulation related to the traveling performance control function for rough-road traveling is permitted by means of the permission confirmation screen related to the virtual experience output before the simulation is actually outputted.

Accordingly, even if the occupant does not give permission for the outputting of the simulation, the occupant may be at least reminded of the presence of the traveling performance control function provided for the vehicle 1 in which the occupant is present and reminded that the traveling performance control function is usable. In addition, in a case where the occupant temporarily remembers the presence of the traveling performance control function provided for the vehicle 1 and is causing the vehicle 1 to travel, such an occupant is able to use the traveling performance control function for the vehicle 1 in a case where the subsequent traveling involves a road such as a rough road. Upon appearance of a road such as a rough road, the occupant is able to perform an operation without hesitation and actually and appropriately use the traveling performance control function. As a result, due to traveling using the traveling performance control function, it is possible for the vehicle 1 to easily travel through a road such as a rough road or to more stably travel on a road such as a rough road. It is possible for the occupant to enjoy the traveling control for the vehicle 1 with improved safety and comfort by using the traveling performance control function provided for the vehicle 1, not only on a dry pavement but also in a route or a region in which the traveling performance control function is possibly used.

In addition, according to the first example embodiment, in a case where the outputting of the simulation is permitted and where the vehicle 1 is in a non-traveling state or in a non-startable state, the simulation related to the traveling performance control function may be outputted. Thus, it is possible to output the simulation related to the traveling performance control function in a case where the vehicle 1 is stopped and is in a safe state and where the occupant gives permission for the outputting of the simulation. It is possible for the occupant to safely experience the simulation related to the traveling performance control function in a safe situation in which the travelable vehicle 1 is stopped.

In addition, the traveling performance control function provided for the vehicle 1 in the first example embodiment may include the traveling performance control function for the vehicle 1 to travel on a rough road. In addition, according to the first example embodiment, it may be determined whether there is a possibility that the vehicle 1 is to travel on a rough road. In a case where there is such a possibility, the confirmation as to whether the outputting of the simulation is permitted may be outputted. According to the first example embodiment, it is thus possible to prevent the simulation related to the traveling performance control function for rough-road traveling from being frequently outputted every time the occupant gets in the vehicle 1. The simulation is prevented from excessively outputted every time the occupant gets in the vehicle 1 and the occupant is prevented from being asked to perform an operation to give permission or not to give permission for the outputting of the simulation. The occupant is prevented from being easily annoyed about the outputting of the simulation related to the traveling performance control function for rough-road traveling.

Second Example Embodiment

Next, a description is given of a second example embodiment of the disclosure. In the following, differences between the second example embodiment and the first example embodiment are mainly described. Configurations similar to those in the above-described first example embodiment are denoted with the same reference numerals to avoid any redundant description.

In the first example embodiment described above, the virtual experience pattern may be outputted at a constant level. In the second example embodiment, the output of the virtual experience pattern may be varied in accordance with the level of the operation performed by the occupant.

According to the second example embodiment, upon outputting, in order from the top, the output contents for the pattern selected from the patterns described in FIG. 5, the ECU 54 may vary the output level in accordance with the operation performed by the occupant while the output contents are being outputted.

For example, upon outputting the first pattern described in FIG. 5, the ECU 54 may output the slipping sound from the speaker 40 at a volume or a height corresponding to an amount of an operation performed on the accelerator pedal 33. For example, the ECU 54 may increase the volume and the height of the slipping sound in accordance with an increase in the operation amount of the accelerator pedal 33. Similarly, the ECU 54 may output the engine blow-up sound from the speaker 40 at a volume or a height corresponding to the operation amount of the accelerator pedal 33. In one example, the ECU 54 may update the displayed value of the tachometer on the meter panel 38 to a greater value in accordance with the operation amount of the accelerator pedal 33. In addition, the ECU 54 may increase the vibration outputted from the steering actuator 41 in accordance with the operation amount of the accelerator pedal 33 and a steering amount of the steering wheel 67. In addition, the ECU 54 may increase an amount of alternately driving the pair of left and right support plates of the lumbar support 42 in accordance with the operation amount of the accelerator pedal 33 and the steering amount of the steering wheel 67.

Accordingly, by operating a member such as the accelerator pedal 33 or the steering wheel 67, it is possible for the occupant to virtually experience, as the traveling situation and the vehicle behavior, the slipping and the idling of the wheels that increase in accordance with the operation amount of the member such as the accelerator pedal 33 or the steering wheel 67.

In addition, upon outputting the second pattern described in FIG. 5, the ECU 54 may output the engine blow-up sound from the speaker 40 at a volume or a height corresponding to the operation amount of the accelerator pedal 33. For example, the ECU 54 may increase the volume and the height of the engine blow-up sound in accordance with an increase in the operation amount of the accelerator pedal 33. In addition, the ECU 54 may increase the operation of the seat actuator 43 in accordance with the operation amount of the accelerator pedal 33 and the steering amount of the steering wheel 67.

Accordingly, by operating a member such as the accelerator pedal 33 or the steering wheel 67, it is possible for the occupant to virtually experience, as the traveling situation and the vehicle behavior, a running-over amount, a deceleration level, or a stuck level that increases in accordance with the operation amount of the member such as the accelerator pedal 33 or the steering wheel 67.

Note that the vehicle inside members to be used by the ECU 54 to vary the simulation output are not limited to those described above. The ECU 54 may use any other vehicle inside member such as the brake pedal 34, the shift lever 35, or the side brake lever 36 to vary the simulation output.

Third Example Embodiment

Next, a description is given of a third example embodiment of the disclosure. In the following, differences between the third example embodiment and the first and second example embodiments are mainly described. Configurations similar to those in the above-described first and second example embodiments are denoted with the same reference numerals to avoid any redundant description.

In the first and second example embodiments described above, the output stage of the virtual experience pattern may be switched at constant timings. In the third example embodiment, the output stage of the virtual experience pattern may be varied in accordance with an operation performed by an occupant.

Figure 7:
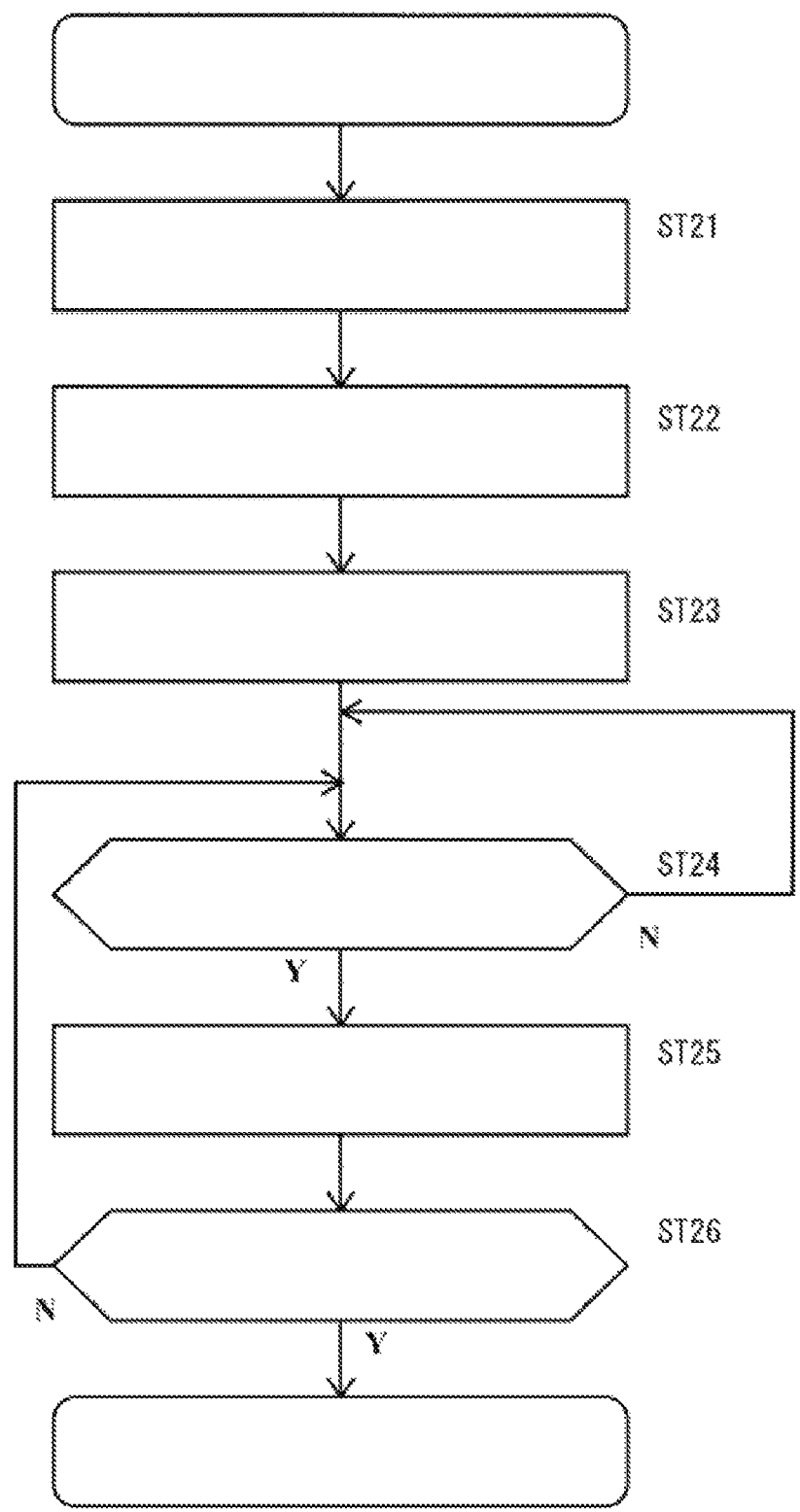
FIG. 7 is an explanatory diagram describing an example of an output control for a virtual experience pattern to be outputted by an output control according to one example embodiment of the disclosure.

FIG. 7 is an explanatory diagram describing an example of an output control for a virtual experience pattern to be outputted by an output control according to the third example embodiment of the disclosure.

The ECU 54 of the user interface control device 22 may execute the output control for the virtual experience pattern described in FIG. 7 in the process in step ST10 described in FIG. 4.

In step ST21, performed may be a step of selecting one of the virtual experience patterns described in FIG. 5 that are recorded in the memory 53. The ECU 54 may, for example, randomly select one of the virtual experience patterns described in FIG. 5 that are recorded in the memory 53. In one example, the ECU 54 may select a pattern that has not been outputted for the longest period.

In step ST22, performed may be a process of starting to output a moving image for the selected pattern. The ECU 54 may read the moving image for the pattern selected in step ST21 from the memory 53 and output the read moving image to the center operation panel 39. Thus, the outputting of the moving image for rough-road traveling may be started on the center operation panel 39. In a case where the first pattern described in FIG. 5 is selected, for example, the ECU 54 may output, to the center operation panel 39, in order moving images for a traveling situation in which the wheel slip due to low traction and the vehicle 1 is stuck.

Note that the ECU 54 may output, to the center operation panel 39, in order the moving image for the traveling situation in which the wheel slips due to low traction and the vehicle 1 is stuck, or the moving image for the situation in which such a traveling situation is dealt with by the X-mode. In this case, the moving image for the simulation related to the traveling performance control function and the moving image for the simulation related to the traveling situation in which the traveling performance control function is to be used may be displayed in order on the center operation panel 39.

In step ST23, performed may be a process of starting outputting to the vehicle inside member corresponding to the moving image for the selected pattern. The ECU 54 may read the first content of the selected pattern from the memory 53 and output the read content. In a case of the first pattern described in FIG. 5, in order to allow the occupant to virtually experience slipping, the ECU 54 may first output the slipping sound from the speaker 40. On this occasion, the ECU 54 may output the slipping sound from the speaker 40 at a volume or a height varied in accordance with the operation amount of the accelerator pedal 33.

In step ST24, performed may be a process of waiting for a predetermined operation to be inputted by the occupant, corresponding to the output to the vehicle inside member. For example, in a case of the first pattern described in FIG. 5, the ECU 54 may wait for the input of the operation such as an operation of releasing the accelerator pedal 33 or a counter steering operation performed on the steering wheel 67 (step ST24: N). These operations generally have an effect of suppressing slipping. If the input of such an operation is received (step ST24: Y), the ECU 54 may cause the process to proceed to step ST25.

In step ST25, performed may be a process of outputting the subsequent content of the selected pattern. The ECU 54 may read the next content of the selected pattern from the memory 53 and output the read content. In the case of the first pattern described in FIG. 5, in order to allow the occupant to virtually experience the engine roar, the ECU 54 may output the engine blow-up sound from the speaker 40. On this occasion, in one example, the ECU 54 may output the engine blow-up sound from the speaker 40 at a volume or a height varied in accordance with the operation amount of the accelerator pedal 33. In addition, in order to allow the occupant to virtually experience the increase in engine speed, the ECU 54 may update the display of the tachometer on the meter panel 38.

In step ST26, performed may be a process of determining whether all the contents of the selected pattern have been outputted. The ECU 54 may determine whether the last content of the selected pattern has been outputted in step ST25. In the case of the first pattern described in FIG. 5, the ECU 54 may determine that the last content of the selected pattern has been outputted if the output content in the fifth row has been outputted.

If the last content of the selected pattern has not been outputted yet (step ST26: N), the ECU 54 may cause the process to return to step ST24. The ECU 54 may repeat the processes from step ST24 to step ST26, and may thereby select and output the contents of the selected pattern in order. The output contents of the selected pattern may proceed stage by stage in accordance with an operation performed by the occupant on the vehicle inside members. In one example, the moving image may be displayed on the center operation panel 39 in such a manner that the moving image proceed stage by stage in accordance with the operation performed by the occupant on the vehicle inside members. In one example, the traveling state of the vehicle 1 displayed on the meter panel 38 may vary for each stage of the moving image that varies stage by stage in accordance with the operation performed by the occupant on the vehicle inside members.

If the last content of the selected pattern has been outputted (step ST26: Y), the ECU 54 may end this control.

Note that the vehicle inside members to be used by the ECU 54 to switch the output stage of the simulation are not limited to those described above. The ECU 54 may use any other vehicle inside member such as the brake pedal 34, the shift lever 35, or the side brake lever 36 to switch the output stage of the simulation.

As described above, according to the third example embodiment, the simulation related to the traveling performance control function of the vehicle 1 may be outputted with use of the vehicle inside members as with the first and second example embodiments described above. In addition, according to the third example embodiment, the moving image for the simulation related to the traveling performance control function or the moving image for the simulation related to the traveling situation in which the traveling performance control function is to be used may be displayed on the center operation panel 39. The moving image for the simulation related to the traveling performance control function and the moving image for the simulation related to the traveling situation in which the traveling performance control function is to be used may proceed stage by stage in accordance with the operation performed on the vehicle inside members. In one embodiment, the center operation panel 39 may serve as an "operation display member". In addition, according to the third example embodiment, the traveling state of the vehicle 1 corresponding to each stage of the moving image displayed on the operation display member may be displayed on the meter panel 38. In one embodiment, the meter panel 38 may correspond to a "traveling display member". Thus, it is possible for the occupant to virtually experience and understand an example of how to perform an operation matching the traveling performance control function for rough-road traveling in addition to the timing and the situation to use the traveling performance control function for rough-road traveling. It is possible for the occupant to execute an appropriate operation matching the traveling performance control function on a later occasion where the occupant actually causes the vehicle 1 to travel on a rough road.

Thus, it is possible for the occupant to learn, for example, how to deal with the behavior of the vehicle 1 in a low traction state such as a wheel slipping state.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the above-described example embodiments, the ECU 54 may output a simulation and thereby allow the occupant to have a virtual experience related to the traveling performance control function for rough-road traveling.

Alternatively, for example, the ECU 54 may output a simulation and thereby allow the occupant to have a virtual experience related to the traveling performance control function for the ASB.

In one example, the traveling performance control function for the ASB for the vehicle 1 may be enabled by an operation performed on a member such as a switch by the occupant.

In the above-described example embodiments, the ECU 54 of the user interface control device 22 may control the simulation output.

Alternatively, for example, an ECU 54 of another device of the control system 20 of the vehicle 1 may control the simulation output. In one example, two or more ECUs 54 of the control system 20 may cooperate with each other to control the simulation output.

In the above-described example embodiments, the data regarding the virtual experience pattern related to the simulation output may be recorded in the memory 53 of the vehicle 1.

Alternatively, for example, the data regarding the virtual experience pattern may be recorded in a memory 53 of a server which is accessible by the vehicle 1. In this case, for example, the ECU 54 of the vehicle 1 may acquire the data regarding the virtual experience pattern from the server via the external communication device 24 and thereby execute the simulation output.

The ECU 54 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 54 illustrated in FIG. 2.

The invention claimed is:

1. A controller for a vehicle, the vehicle having a traveling performance control function configured to control distribution of driving force to individual wheels of the vehicle for traveling on rough roads, the distribution being different from that on roads other than the rough roads, the controller comprising:
   a memory configured to store virtual experience patterns, each of the virtual experience patterns including data and a program for expressing a situation in which the vehicle travels on rough roads using the traveling performance control function by controlling a display and at least one of a steering actuator, a seat actuator, and a lumbar support installed in the vehicle; and
   a processor coupled with the memory, the processor being configured to:
      detect a possibility of traveling on a rough road in a route from a current location to a destination; and
      in response to detecting the possibility, control, while the vehicle is in a stopped state, the display and the at least one of the steering actuator, the seat actuator, and the lumbar support based on one of the virtual experience patterns to generate effects corresponding to the situation in which the vehicle travels on rough roads using the traveling performance control function,
   wherein the generated effects include causing the display to show a moving image and causing the at least one of the steering actuator, the seat actuator, and the lumbar support to move in a manner that simulates motion of the vehicle during travel on the rough roads, thereby allowing a driver seated in a driver's seat of the vehicle to physically experience the motion of the vehicle as if traveling on the rough roads using the traveling performance control function.

2. The controller according to claim 1,
   wherein the stopped state includes a non-traveling state or a non-startable state of the vehicle, and
   wherein the processor is further configured to:
      determine that the vehicle is in the non-traveling state or the non-startable state based on an operation state of an operation member that is provided in the vehicle to drive the vehicle; and
      control the display and the at least one of the steering actuator, the seat actuator, and the lumbar support of the vehicle to generate the effects corresponding to the situation in which the vehicle travels on rough roads using the traveling performance control function in a case where the vehicle is in the non-traveling state or the non-startable state.

3. The controller according to claim 2, wherein
   the vehicle comprises the operation member configured to be operated by the driver to cause the vehicle to travel,
   the display includes a traveling display member configured to display a traveling state of the vehicle with respect to the driver, and an operation display member configured to be operated by the driver, and
   the processor is further configured to:
      cause the operation display member to show a first moving image related to the traveling performance control function or a second moving image related to a traveling situation in which the traveling performance control function is to be used, the first moving image related to the traveling performance control function and the second moving image related to the traveling situation in which the traveling performance control function is to be used being to proceed stage by stage in accordance with an operation performed on the operation member, and
      cause the traveling display member to show the traveling state of the vehicle corresponding to each stage of the first or second moving image displayed on the operation display member.

4. The controller according to claim 2, wherein the effects corresponding to the situation in which the vehicle travels on the rough roads using the traveling performance control function include at least one of: a simulation of a traveling situation in which a wheel of the vehicle slips and the vehicle becomes stuck, and a simulation of a traveling situation in which a wheel of the vehicle runs over an obstacle and the vehicle decelerates.

5. The controller according to claim 3, wherein the effects corresponding to the situation in which the vehicle travels on the rough roads using the traveling performance control function include at least one of: a simulation of a traveling situation in which a wheel of the vehicle slips and the vehicle becomes stuck, and a simulation of a traveling situation in which a wheel of the vehicle runs over an obstacle and the vehicle decelerates.

6. The controller according to claim 1, wherein
   the vehicle comprises at least an operation member configured to be operated by the driver to cause the vehicle to travel,
   the display includes a traveling display member configured to display a traveling state of the vehicle with respect to the driver, and an operation display member configured to be operated by the driver, and
   the processor is further configured to:
      cause the operation display member to show a first moving image related to the traveling performance control function or a second moving image related to a traveling situation in which the traveling performance control function is to be used, the first moving image related to the traveling performance control function and the second moving image related to the traveling situation in which the traveling performance control function is to be used being to proceed stage by stage in accordance with an operation performed on the operation member, and
      cause the traveling display member to show the traveling state of the vehicle corresponding to each stage of the first or second moving image displayed on the operation display member.

7. The vehicle controller according to claim 6, wherein the effects corresponding to the situation in which the vehicle travels on the rough roads using the traveling performance control function include at least one of: a simulation of a traveling situation in which a wheel of the vehicle slips and the vehicle becomes stuck, and a simulation of a traveling situation in which a wheel of the vehicle runs over an obstacle and the vehicle decelerates.

8. The controller according to claim 1, wherein the effects corresponding to the situation in which the vehicle travels on the rough roads using the traveling performance control function include at least one of: a simulation of a traveling situation in which a wheel of the vehicle slips and the vehicle becomes stuck, and a simulation of a traveling situation in which a wheel of the vehicle runs over an obstacle and the vehicle decelerates.

9. The controller according to claim 1,
wherein the vehicle further includes:
　a speaker configured to output a wheel slip sound or an engine roar in accordance with a content of the moving image; and
　a tachometer configured to simulate a change in engine speed in accordance with the content of the moving image,
wherein the steering actuator is configured to output vibration to a steering wheel in accordance with the content of the moving image,
wherein the lumbar support configured to alternately drive a pair of left and right support plates of the lumbar support installed in at least the driver's seat, and
wherein the seat actuator configured to vary a position or an angle of at least the driver's seat.

* * * * *